United States Patent
Akita et al.

(10) Patent No.: US 6,775,239 B1
(45) Date of Patent: Aug. 10, 2004

(54) CHECKING COMMUNICATION-PATH DATA IN MPLS COMMUNICATION SCHEME

(75) Inventors: Kenichi Akita, Nagoya (JP); Yuko Tangiku, Nagoya (JP); Kazuhiro Ozawa, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 639 days.

(21) Appl. No.: 09/626,334

(22) Filed: Jul. 26, 2000

(30) Foreign Application Priority Data

Oct. 29, 1999 (JP) .......................................... 11-310135

(51) Int. Cl.[7] .................................................. H04J 3/14
(52) U.S. Cl. ........................ 370/248; 370/249; 370/250
(58) Field of Search .......................... 370/395.1, 241.1, 370/248, 249, 252, 250, 251

(56) References Cited

U.S. PATENT DOCUMENTS

| 4,710,769 A | 12/1987 | Friedman et al. | |
|---|---|---|---|
| 5,659,540 A | * 8/1997 | Chen et al. | ................. 370/249 |
| 5,864,555 A | * 1/1999 | Mathur et al. | ........... 370/236.2 |
| 6,356,544 B1 | * 3/2002 | O'Connor | .................... 370/353 |
| 6,507,577 B1 | * 1/2003 | Mauger et al. | ............. 370/356 |
| 6,522,627 B1 | * 2/2003 | Mauger | ...................... 370/230 |

FOREIGN PATENT DOCUMENTS

JP    6-11134    2/1994

* cited by examiner

Primary Examiner—Kenneth Vanderpuye
(74) Attorney, Agent, or Firm—Katten Muchin Zavis Rosenman

(57) ABSTRACT

A method of checking communication-path data in a system, in which a router connecting first and second networks operating on different protocols is connected to a switch of the second network, includes the steps of changing the router and the switch from a normal mode to a test mode, checking consistency between router communication-path data controlled by the router and switch communication-path data controlled by the switch by sending the router communication-path data to the switch during the test mode, and checking communication between the router and the switch by sending cells from the router to the switch and returning the cells from the switch to the router during the test mode.

7 Claims, 8 Drawing Sheets

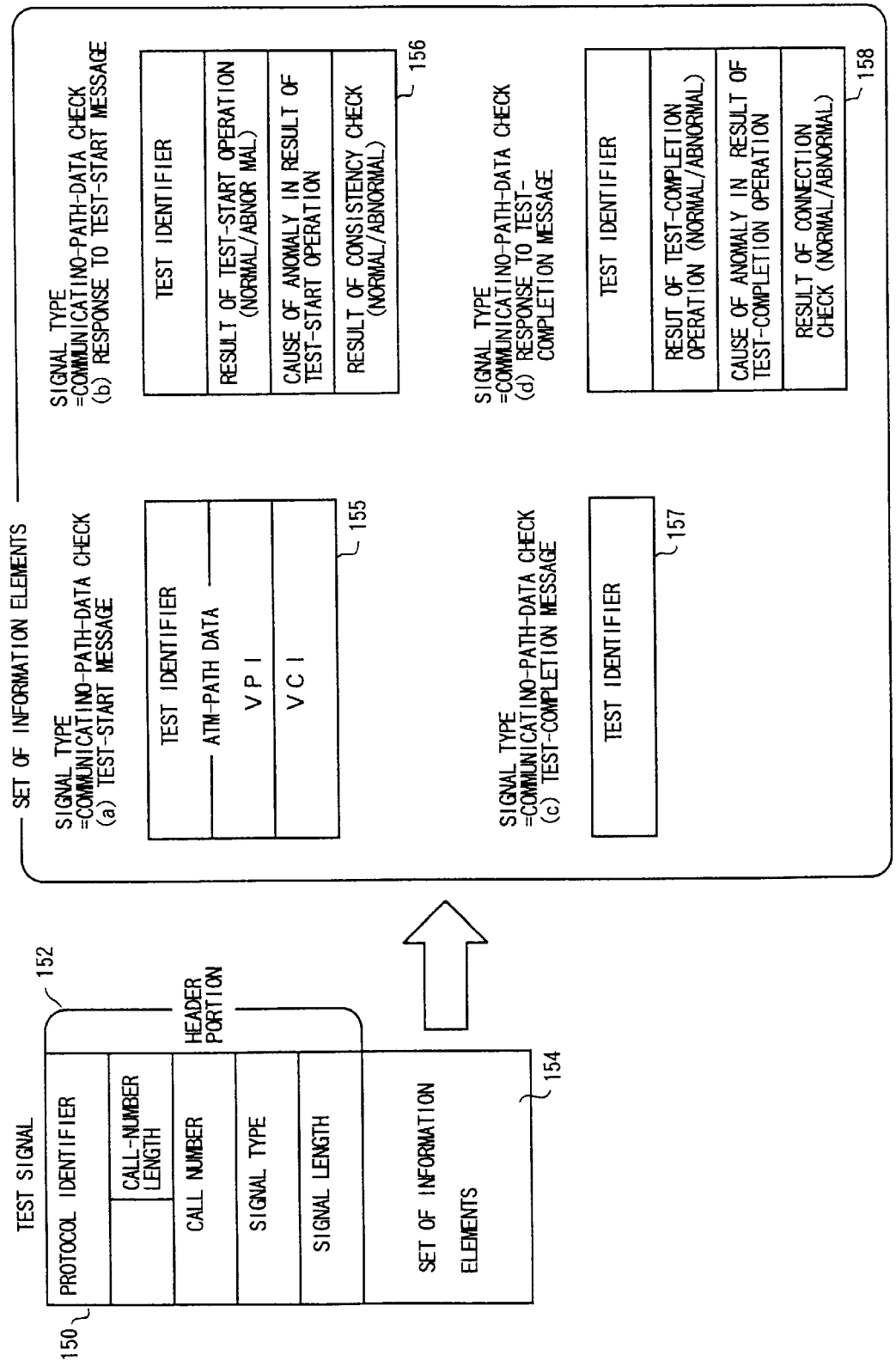

CHECKING COMMUNICATION-PATH DATA IN MPLS COMMUNICATION SCHEME

BACKGROUND OF THE INVENTION

1. Field of the Invention

The present invention generally relates to a method of checking communication-path data in an MPLS (multi protocol label switching) communication scheme, and relates to a router a switch, and a communication system operating based on such a method. The present invention particularly relates to a method of checking communication-path data in an MPLS communication scheme for the purpose of checking integrity of label data controlled by a MPLS router and switch data controlled by a trunk switch, and relates to a router, a switch, and a communication system operating based on such a method.

2. Description of the Related Art

In the MPLS communication system that uses ATM (asynchronous transfer mode) switches as trunk switches, data for communication control purposes are maintained as label data controlled by an MPLS router and switch data controlled by an ATM switch.

FIG. 1 is an illustrative drawing showing a system based on the MPLS communication scheme.

An MPLS router 11 converts an IP packet 12 into an ATM cell 21 when the IP packet 12 is supplied from an IP (internet protocol) network 10, and supplies the ATM cell 21 to an ATM network 20. The ATM cell 21 is transferred to an MPLS router 31 via ATM switches 22 and 24 and the like through ATM switching based on PVC (permanent virtual circuit).

The MPLS, router 31 extracts an IP packet 32 from an ATM cell 25 supplied from the ATM network 20, and supplies the IP packet 32 to an IP network 30.

The MPLS communication scheme will be described further in detail in the following.

FIG. 2 is an illustrative drawing for explaining a principle of the MPLS communication system.

In FIG. 2, an MPLS router 40 is provided with label data 41, which indicates correspondences between destination IP addresses and VPI/VCI (virtual path identifier/virtual channel identifier). An ATM switch 50 is provided with switch data 51 that is used for ATM switching.

The MPLS router 40 converts IP packets 42 and 43 supplied from the IP network into ATM cells 44 and 45 by utilizing the label data 41, and supplies the ATM cells 44 and 45 to the ATM switch 50. For example, when the IP packet 42 is supplied, the MPLS router 40 refers to a destination IP address "164.69.15.2" of the IP header, and reads VPI/VCI "1/10" from the label data 41 that corresponds to this destination IP address. Then, the MPLS router 40 generates the ATM cell 44 by using the obtained VPI/VCI and the IP packet 42.

The ATM switch 50 performs ATM switching on the ATM cells 44 and 45 supplied from the MPLS router 40 where the switch data 51 is used for such ATM switching. By switching, the ATM switch 50 transfers the ATM-cells 44 and 45 to an MPLS router 60 or an MPLS router 61. For example, when the ATM cell 44 is supplied, the ATM switch 50 refers to the VPI/VCI "1/10", and reads VPI/VCI "2/15" and an output-communication-line number 1 from the switch data 51 as they correspond to the VPI/VCI "1/10". Then, the ATM switch 50 generates an ATM cell 52 by utilizing the obtained VPI/VCI, and outputs the ATM cell 52 to the communication line of the output-communication-line number 1.

The MPLS router 60 extracts an IP packet 62 from the ATM cell 52 supplied from the ATM switch 50, and outputs the IP packet 62 to an IP network.

In this manner, data necessary for communication control in the MPLS communication scheme are kept in storage as the label data 41 controlled by the MPLS router and the switch data 51 controlled by the trunk switch.

When there is a need to identify a fault point during a setup of communication or upon detection of communication fault, the label data 41 and the switch data 51 have to be checked as to their contents. Further, in such a situation, the ATM communication lines need to be monitored to check whether the MPLS router 40 is operating normally to perform ATM-cell conversion as well as to check whether the ATM switch is receiving ATM cells without trouble.

In order to check the label data controlled by the MPLS router and the switch data controlled by the trunk switch, a visual inspection of the data is necessary. When the MPLS router and the trunk switch are located at physically distanced places or maintained by different administrators, such a visual inspection may be difficult.

Namely, in such cases, a check on the label data and the switch data cannot be made promptly, thereby making it difficult to promptly identify a fault point.

Further, apart from monitoring the communication lines, there is no other way of checking whether the MPLS router is correctly converting protocol data for the trunk switch and checking whether the protocol data converted by the MPLS router is correctly supplied to the trunk switch.

Accordingly, there is a need for a method for checking communication-path data in the MPLS communication system where the method can help to identify a fault point promptly and easily and help to make a prompt recovery.

SUMMARY OF THE INVENTION

It is a general object of the present invention to provide a method for checking communication-path data that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a method, a router, and a switch particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a method of checking communication-path data in a system in which a router connecting first and second networks operating on different protocols is connected to a switch of the second network. The method includes the steps of changing the router and the switch from a normal mode to a test mode, checking consistency between router communication-path data controlled by the router and switch communication-path data controlled by the switch by sending the router communication-path data to the switch during the test mode, and checking communication between the router and the switch by sending cells from the router to the switch and returning the cells from the switch to the router during the test mode.

In the method described above, the communication-path data controlled by the router and the communication-path data controlled by the switch are checked as to whether they are consistent with each other, and cells transmitted from the router to the switch are returned from the switch to the router so as to allow a check to be made as to communication between the router and the switch, so that a consistency check of the communication-path data, a cell-transparency check, and a connection check between the router and the switch can be easily made.

Accordingly, the method of checking communication-path data according to the present invention can help to identify a fault point easily and promptly in the communication system. In other words, when the communication system suffers a fault, it is possible to decide which one of the trunk switch and the router is suffering the fault, thereby separating the fault point from the rest of the system.

According to another aspect of the present invention, test signals are used for reporting results of the consistency check and results of the communication check. Therefore, the check results can be promptly and easily collected, which allows a fault point to be readily identified in a short time period.

BRIEF DESCRIPTION OF THE DRAWINGS

FIG. 8 is an illustrative drawing for explaining an example of a test signal used in the communication system of the present invention.

DESCRIPTION OF THE PREFERRED EMBODIMENTS

In the following, embodiments of the present invention will be described with reference to the accompanying drawings.

In the embodiments disclosed herein, a description will be given with reference to an MPLS communication system based on ATM switches operating as trunk switches. It should be noted, however, that the present invention is not limited to such a particular configuration. For example, frame relays, a CDMA scheme, etc., may be used as trunk switches.

Figure 1:
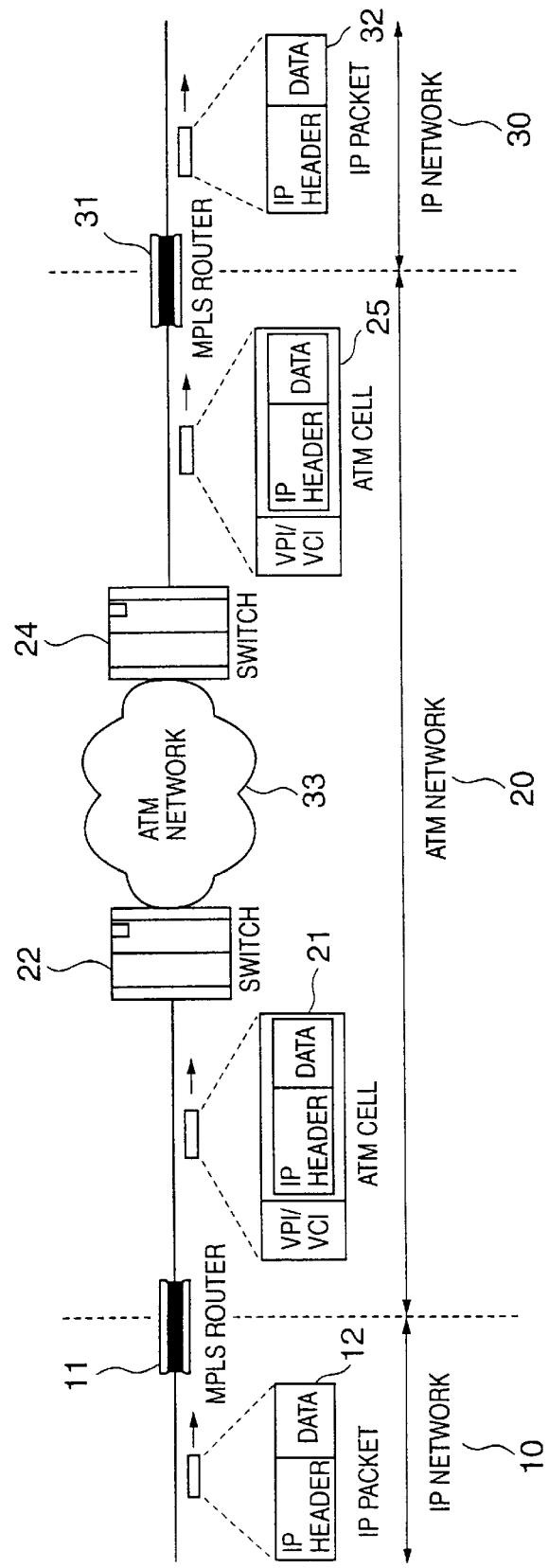
FIG. 1 is an illustrative drawing showing a system based on the MPLS communication scheme.
Figure 2:
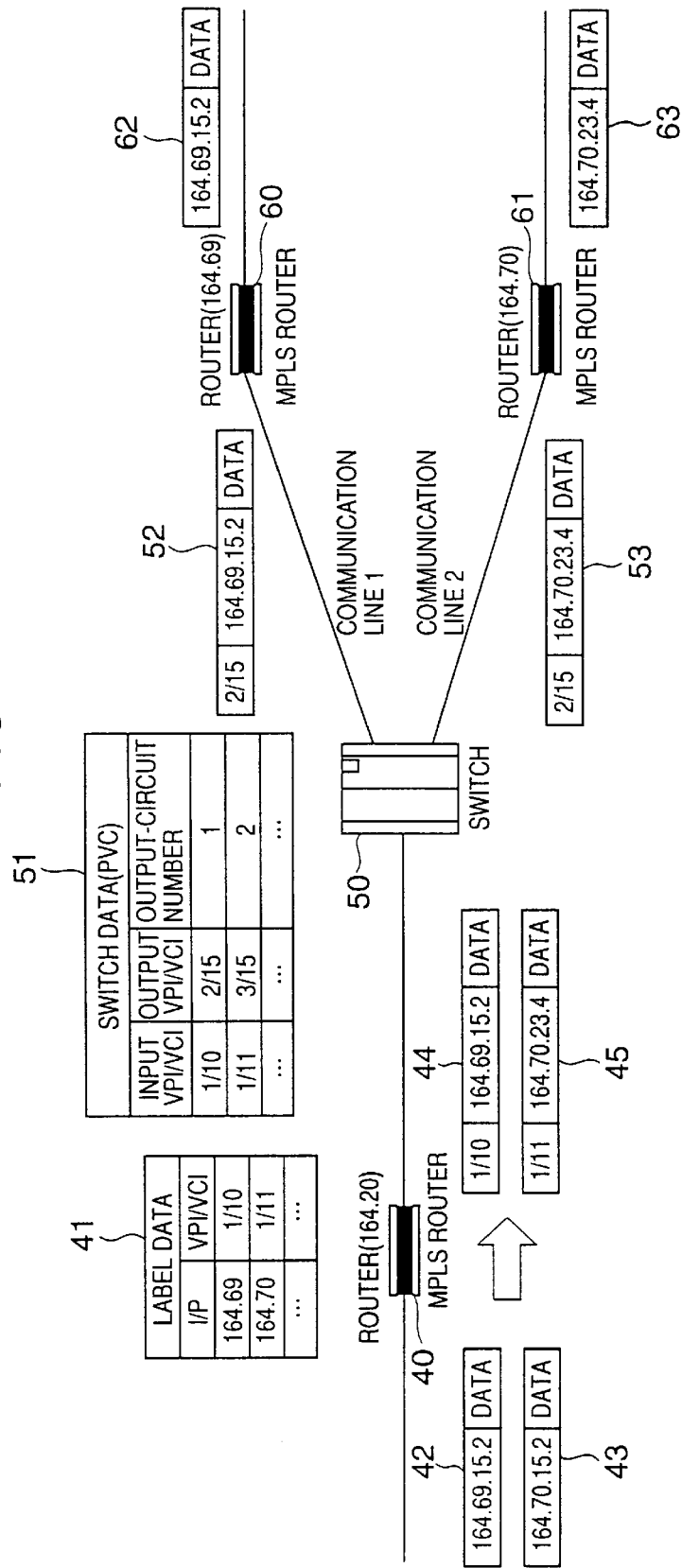
FIG. 2 is an illustrative drawing for explaining a principle of the MPLS communication system.
Figure 3:
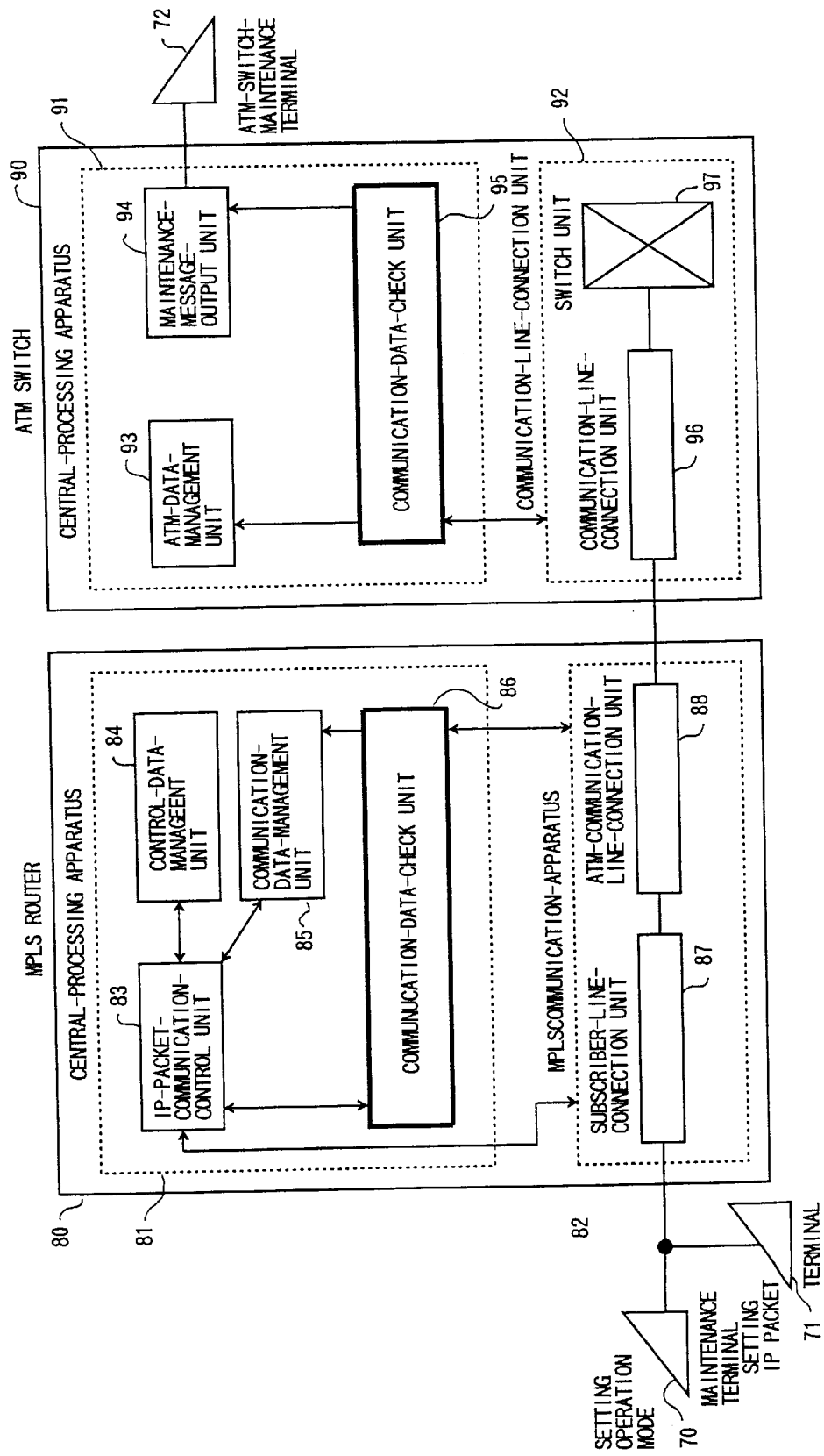
FIG. 3 is a block diagram of a communication system according to an embodiment of the present invention.

FIG. 3 is a block diagram of a communication system according to an embodiment of the present invention.

In FIG. 3, a communication system of FIG. 3 includes a maintenance terminal 70, a terminal 71, an MPLS router 80, an ATM switch 90, and an ATM-switch-maintenance terminal 72.

Details of this communication system are as follows. The MPLS router 80 includes a central-processing apparatus 81 and an MPLS-communication apparatus 82. The central-processing apparatus 81 includes an IP-packet-communication-control unit 83, a control-data-management unit 84, a communication-path-data-management unit 85, and a communication-path-data-check unit 86. The MPLS-communication apparatus 82 includes a subscriber-line-connection unit 87 and an ATM-communication-line-connection unit 88.

The ATM switch 90 includes a central-processing apparatus 91 and a communication-line-control apparatus 92. The central-processing apparatus 91 includes an ATM-data-management unit 93, a maintenance-message-output unit 94, and a communication-path-data-check unit 95. The communication-line-control apparatus 92 includes a communication-line-connection unit 96 and a switch unit 97.

Figure 4:
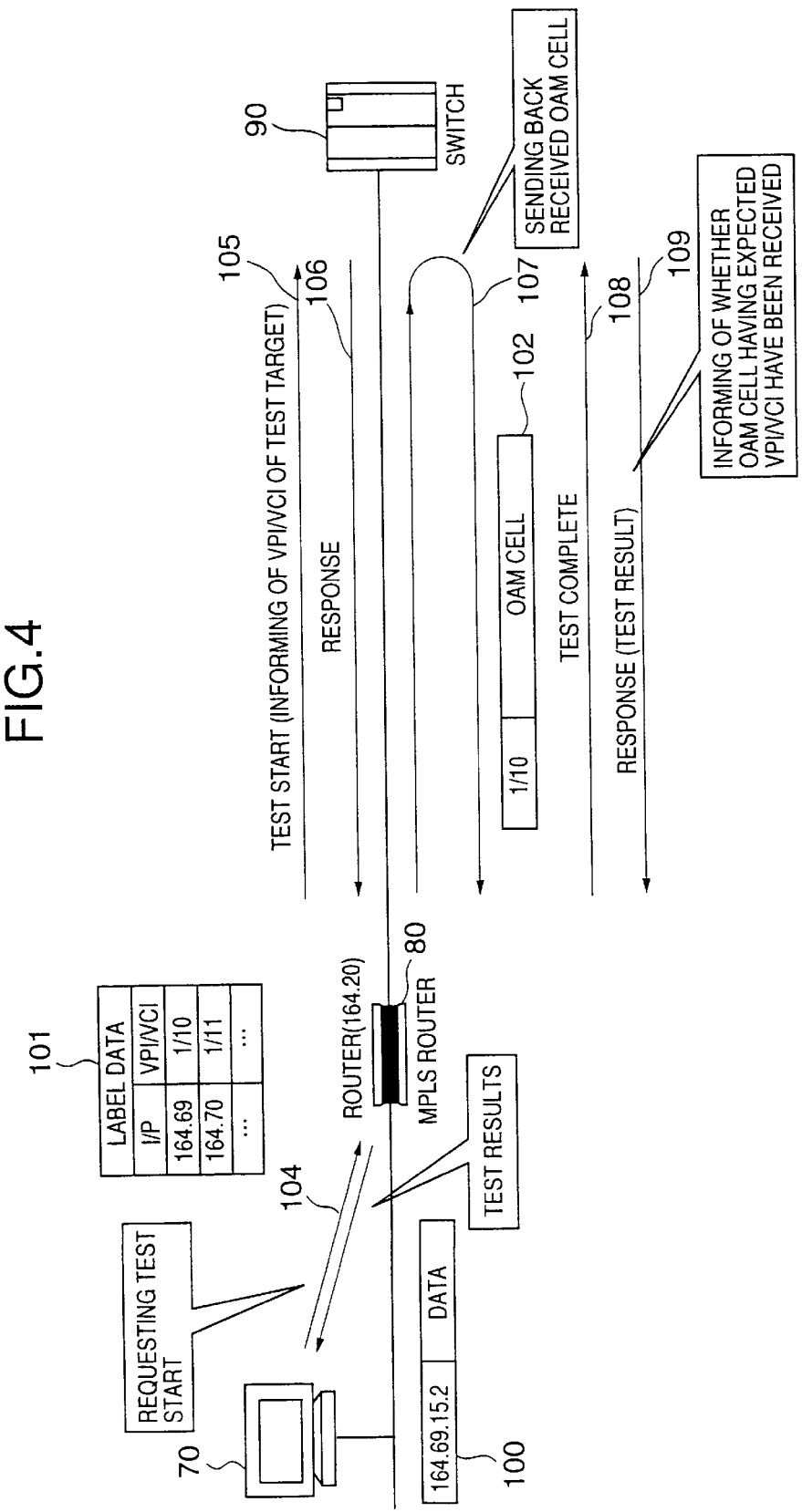
FIG. 4 is an illustrative drawing for explaining a method of checking communication-path data in the MPLS-communication scheme according to the present invention.
Figure 5:
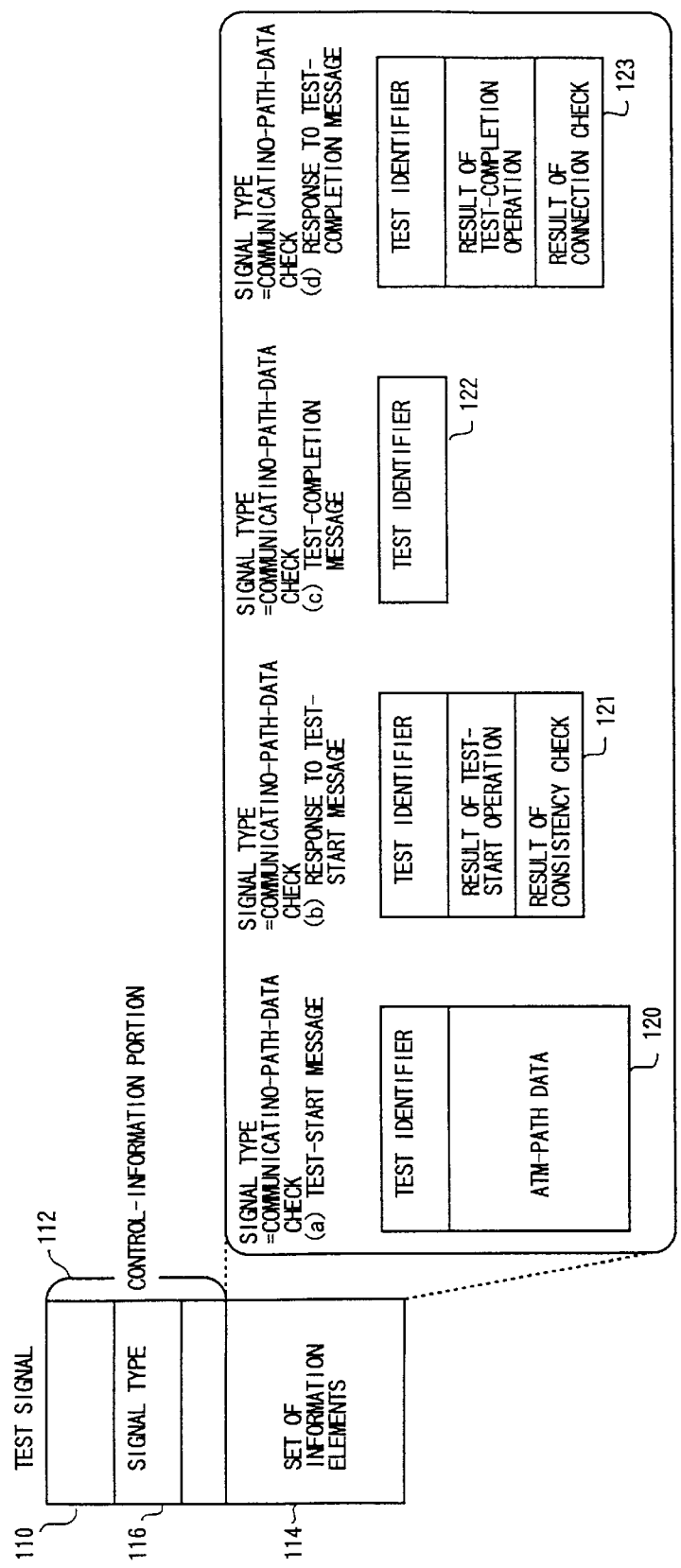
FIG. 5 is an illustrative drawing for explaining test signals used in the MPLS-communication scheme of the present invention.

In the following, the operation of the communication system of FIG. 3 will be described. FIG. 4 is an illustrative drawing for explaining a method of checking communication-path data in the MPLS-communication scheme according to the present invention. FIG. 5 is an illustrative drawing for explaining test signals used in the MPLS-communication scheme of the present invention.

The IP-packet-communication-control unit 83 is equipped with a function of receiving IP packets supplied from the maintenance terminal 70 or the terminal 71, a function of converting the received IP packets into ATM cells, a function of transmitting the converted ATM cells to the ATM switch 90, a function of receiving ATM cells supplied from the ATM switch 90, a function of converting the received ATM cells into IP packets, and a function of transmitting the converted IP packets to the maintenance terminal 70 or the terminal 71.

The IP-packet-communication-control unit 83 sends a switch request to the control-data-management unit 84 to change the IP-address-operation mode toga test mode when a signal 104 indicative of a start of a test is supplied from the maintenance terminal 70 as shown in FIG. 4. When receiving an IP packet 100 from the terminal 71, the IP-packet-communication-control unit 83 checks with the control-data-management unit 84 to learn the IP-address-operation mode, and sends a test-start request to the communication-path-data-check unit 86 if the IP-address-operation mode is a test mode.

When receiving a test-completion message from the communication-path-data-check unit 86, the IP-packet-communication-control unit 83 sends a switch request to the control-data-management unit 84 to change the IP-address-operation mode to a normal-operation mode. The control-data-management unit 84 is equipped with a function of managing and controlling an IP-address-operation mode for each one of IP addresses.

The communication-path-data-management unit 85 is provided with a function of managing and controlling ATM-path data VPI/VCI corresponding to IP addresses. This function is implemented by use of label data 101 shown in FIG. 4. During a period when the IP-address-operation mode indicates a normal operation mode, the communication-path-data-management unit 85 converts the IP packets into ATM cells.

When the IP-address-operation mode is a test mode, the communication-path-data-management unit 85 can generate OAM (operation, administration, and maintenance) cells 102 having ATM-path data VPI/VCI corresponding to a tested IP address. The OAM cells 102 are used for identifying a fault position, for example, and are characterized by their nature to return to their source position through backward transmission.

The communication-path-data-check unit 86 is provided with a test-processing-control function, a test-signal-control function, and a test-cell-exchange-control function. The test-processing-control function takes care of test-processing operations 105 through 109 as shown in FIG. 4. The test-signal-control function takes care of exchanges of test signals between the MPLS router 80 and the ATM switch 90. For example, the test signals that are exchanged may be that shown in FIG. 5. The test-cell-exchange-control function takes care of exchanges of OAM cells 102.

In the following, a description will be given with regard to a test signal with reference to FIG. 5.

A test signal 110 includes control-information portion 112 and a set of information elements 114. The control-information portion 112 includes a signal type 116. The test signal 110 includes varying data in the set of information elements 114 that depends on the signal type 116.

When the signal type 116 indicates that the signal is a test-start message, the set of information elements 114 is comprised of a set of information elements 120 that includes a test identifier and ATM-path data. The test signal 110 including the set of information elements 120 is transmitted from the MPLS router 80 to the ATM switch 90 during the test-processing operation 105 as shown in FIG. 4.

When the signal type 116 indicates that the signal is a response to a test-start message, the set of information elements 114 is comprised of a set of information elements 121 that includes a test identifier, a test-start-operation result, and a consistency-check result. The test signal 110 including the set of information elements 121 is transmitted from the ATM switch 90 to the MPLS router 80 during the test-processing operation 106 as shown in FIG. 4.

When the signal type 116 indicates that the signal is a test-completion message, the set of information elements 114 is comprised of a set of information elements 122 that includes a test identifier. The test signal 110 including the set of information elements 122 is transmitted from the MPLS router 80 to the ATM switch 90 during the test-processing operation 108 as shown in FIG. 4.

When the signal type 116 indicates that the signal is a response to a test-completion message, the set of information elements 114 is comprised of a set of information elements 123 that includes a test identifier, a test-completion-operation result, and a connection-check result. The test signal 110 including the set of information elements 123 is transmitted from the ATM switch 90 to the MPLS router 80 during the test-processing operation 109 as shown in FIG. 4.

With reference to FIG. 3 again, a description of the communication system will be further given in the following.

The ATM-data-management unit 93 is provided with a function of managing and controlling connections between ATM-path data controlled by the communication-path-data-management unit 85 and ATM-path data of an ATM communication partner. Namely, the ATM-data-management unit 93 is provided with the switch data.

The communication-path-data-check unit 95 is equipped with a test-processing-control function, a test-signal-control function, and a test-cell-monitor-control function. The test-processing-control function controls test-processing operations that are performed on the side of the ATM switch 90 among the test-processing operations 105 through 109 as shown in FIG. 4. The test-signal-control function controls exchange of test signals between the ATM switch 90 and the MPLS router 80.

The test-cell-monitor-control function controls exchange of the OAM cells 102 that are transmitted from the MPLS router 80. The maintenance-message-output unit 94 supplies a message to the ATM-switch-maintenance terminal 72 connected to the ATM switch 90 where the message reports events that occurred in the ATM switch 90.

In the following, details of the communication system according to the present invention will be described with accompanying drawings.

Figure 6:
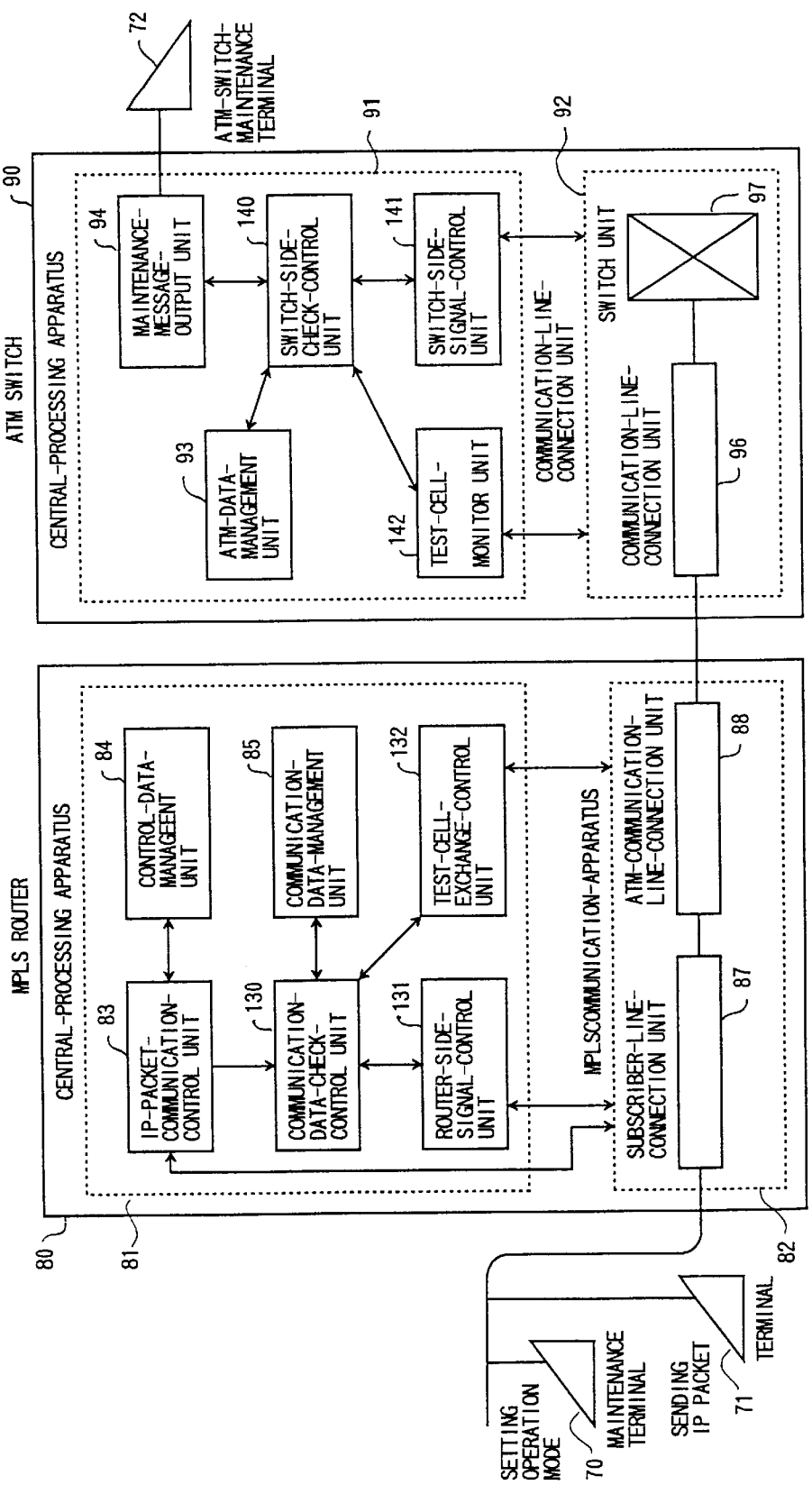
FIG. 6 is a block diagram of another embodiment of the communication system according to the present invention.
Figure 7:
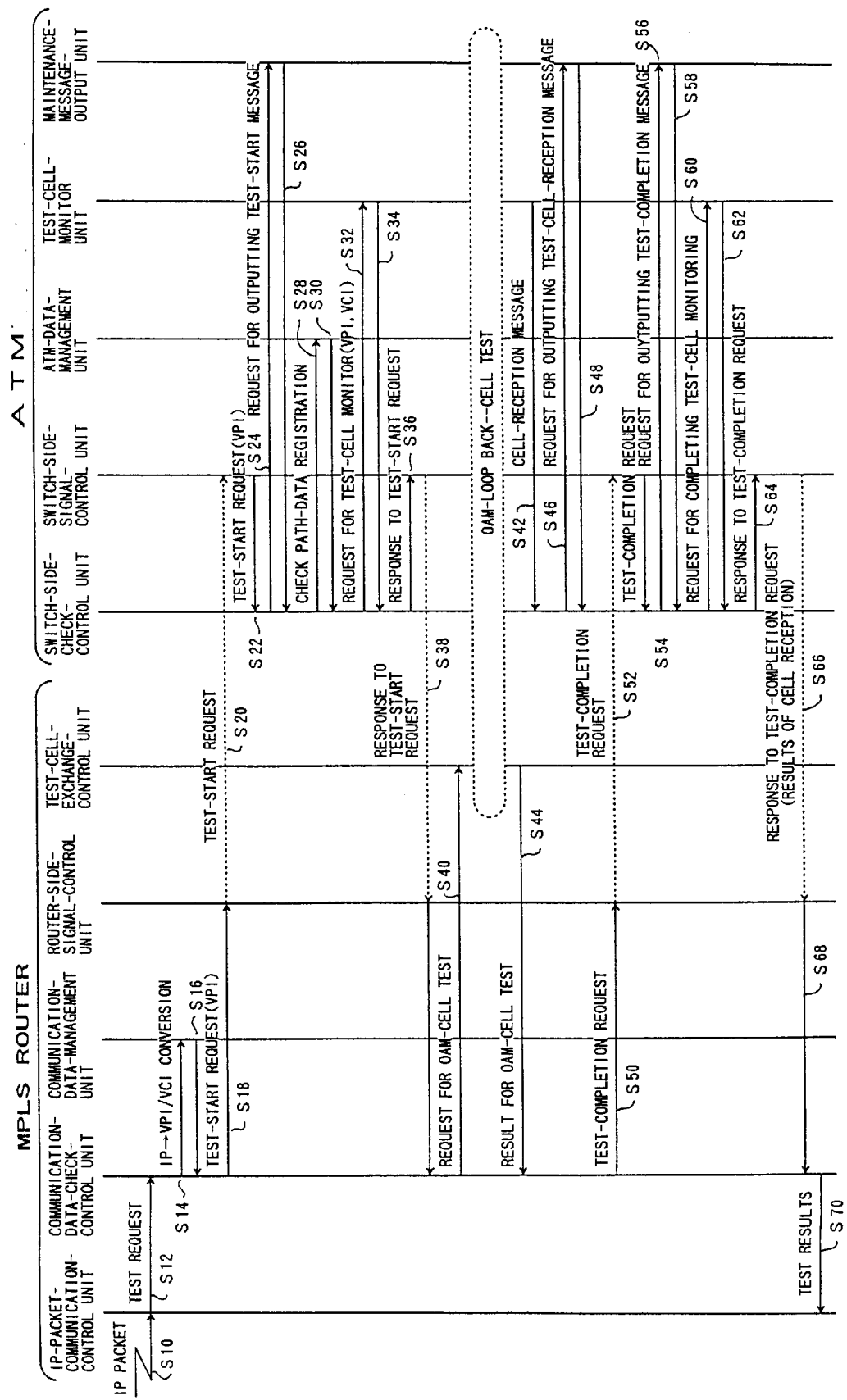
FIG. 7 is a sequence chart showing an example of operation of the communication system according to the present invention.

FIG. 6 is a block diagram of another embodiment of the communication system according to the present invention. FIG. 7 is a sequence chart showing an example of operation of the communication system according to the present invention. FIG. 8 is an illustrative drawing for explaining an example of a test signal used in the communication system of the present invention. In FIG. 6, the same elements as those of FIG. 3 are referred to by the same numerals, and a description thereof will be omitted.

When a test for checking communication-path data is to be started, an administrator uses a remote terminal such as the maintenance terminal 70 to access the MPLS router 80, and requests a change of the IP-address-operation mode to a test mode. The request is sent to the control-data-management unit 84 via the IP-packet-communication-control unit 83, and the control-data-management unit 84 changes the IP-address-operation mode to a test mode.

The sequence chart of FIG. 7 shows processing that is performed after the IP-address-operation mode is changed to a test mode. In FIG. 7, at a step S10, an administrator arranges to send an IP packet from any terminal such as the terminal 71 to the MPLS router 80. At a step S12, the IP-packet-communication-control unit 83 checks with the control-data-management unit 84 to learn the IP-address-operation mode. If the IP-address-operation mode is a test mode, the IP-packet-communication-control unit 83 sends a test-start request to a communication-path-data-check-control unit 130.

At a step S14, the communication-path-data-check-control unit 130 obtains a test identifier, and, thereafter, requests the communication-path-data-management unit 85 to read ATM-path data that corresponds to the specified IP address. At a step S16, the communication-path-data-management unit 85 supplies the requested ATM-pass data to the communication-path-data-check-control unit 130.

At a step S18, the communication-path-data-check-control unit 130 requests a router-side-signal-control unit 131 to send a test-start request based on the ATM path data and the test identifier. At a step S20, the router-side-signal-control unit 131 generates a test signal 150 including a set of information elements 155 as shown in FIG. 8 based on the supplied ATM-path data and the test identifier. The test signal 150 is supplied to the ATM switch 90 from the MPLS router 80.

When the test signal 150 is transmitted from the MPLS router 80 to the ATM switch 90, a switch-side-signal-control unit 141 receives the test signal 150, and, then, extracts the test identifier and the ATM-path data. At a step S22, the switch-side-signal-control unit 141 notifies a switch-side-check-control unit 140 of the test identifier and the ATM-path data.

At a step S24, the switch-side-check-control unit 140, when capturing resources for test control that correspond to the test identifier, keeps the ATM-path data, and, then, sends an output request to the maintenance-message-output unit 94 to output the test-start message. The maintenance-message-output unit 94 notifies the administrator at the ATM-switch-maintenance terminal 72 that a test is going to be conducted. At a step S26, the maintenance-message-output unit 94 sends a response to the output request to the switch-side-check-control unit 140.

At a step S28, the switch-side-check-control unit 140 sends a check request to check if the extracted ATM-path data is registered in the ATM-data-management unit 93. At a step S30, the ATM-data-management unit 93 checks if the extracted ATM-path data is registered, and reports check results to the switch-side-check-control unit 140.

At a step S32, the switch-side-check-control unit 140 sends a cell-monitor request to a test-cell-monitor unit 142. At a step S34, the test-cell-monitor unit 142 sends a response to the call-monitor request to the switch-side-check-control unit 140. Further, the test-cell-monitor unit 142 sends a request for received-ATM-cell check to the communication-line-control apparatus 92, thereby placing the ATM switch 90 in a state of reception monitoring.

After reception monitoring begins, at a step S36, the switch-side-check-control unit 140 requests the switch-side-signal-control unit 141 to transmit a response to the test-start request based on results of test-start operation and the results of ATM-path-data-consistency check. At a step S38, based on the results of test-start operation and the results of ATM-path-data-consistency check, the switch-side-signal-control unit 141 generates the test signal 150 having a set of information elements 156 as shown in FIG. 8, and transmits the test signal 150 from the ATM switch 90 to the MPLS router 80.

Upon receiving the test signal 150 from the ATM switch 90, the communication-path-data-check-control unit 130 extracts the test identifier, the results of test-start operation, causes of anomaly in the results of test-start operation, and the results of consistency check.

If the results of test-start operation and the results of consistency check are normal, at a step S40, the communication-path-data-check-control unit 130 sends an OAM-cell-test-start request to a test-cell-exchange-control unit 132. If the results of test-start operation and the results of consistency check indicate presence of anomalies, the communication-path-data-check-control unit 130 informs the maintenance terminal 70 of this fact via the IP-packet-communication-control unit 83. Then, the test procedure comes to an end.

Upon receiving the OAM-cell-test-start request, the test-cell-exchange-control unit 132 requests the MPLS-communication apparatus 82 to transmit OAM cells. The MPLS-communication apparatus 82 generates OAM cells corresponding to the extracted VPI/VCI, and transmits the OAM cells to the ATM switch 90.

Upon receiving the OAM cells, the communication-line-control apparatus 92 of the ATM switch 90 notifies the test-cell-monitor unit 142 of information on the received cells, and sends back the OAM cells to the MPLS router 80. At a step S42, the test-cell-monitor unit 142 sends the information on the received cells to the switch-side-check-control unit 140.

At a step S46, having received the cell information, the switch-side-check-control unit 140 checks connections to find no anomalies, and keeps results of the check. Further, the switch-side-check-control unit 140 sends an output request to the maintenance-message-output unit 94 to output a message indicative of reception of the OAM cells. In response, the maintenance-message-output unit 94 informs the administrator at the ATM-switch-maintenance terminal 72 that the OAM cells have been received. At a step S48, the maintenance-message-output unit 94 sends a response to the output request to the switch-side-check-control unit 140.

The OAM cells returning from the communication-line-control apparatus 92 are received by the MPLS-communication apparatus 82. The MPLS-communication apparatus 82 matches the returned OAM cells with the transmitted OAM cells, and finds no anomalies in the cell-transparency check between the MPLS router 80 and the ATM switch 90. The MPLS-communication apparatus 82 reports the results of the check to the test-cell-exchange-control unit 132.

At a step S44, the test-cell-exchange-control unit 132 sends the results of the cell-transparency check to the communication-path-data-check-control unit 130. At a step S50, the communication-path-data-check-control unit 130 requests the router-side-signal-control unit 131 to transmit a test-completion request based on the test identifier. At a step S52, the router-side-signal-control unit 131 generates a test signal 150 having a set of information elements 157 shown in FIG. 8 based on the test identifier, and transmits the test signal 150 from the MPLS router 80 to the ATM switch 90.

When the test signal 150 is sent from the MPLS router 80 to the ATM switch 90, the switch-side-signal-control unit 141 receives the test signal 150, and extracts the test identifier. At a step S54, the switch-side-signal-control unit 141 informs the switch-side-check-control unit 140 of the extracted test identifier.

At a step S56, the switch-side-check-control unit 140, when successfully capturing resources for test control corresponding to the test identifier, sends an output request to the maintenance-message-output unit 94 to output a test-completion message. The maintenance-message-output unit 94 notifies the administrator at the ATM-switch-maintenance terminal 72 that the test is completed. At a step S58, the maintenance-message-output unit 94 sends a response to the output request to the switch-side-check-control unit 140.

At a step S60, the switch-side-check-control unit 140 sends a request for completion of cell monitoring to the test-cell-monitor unit 142. At a step S62, the test-cell-monitor unit 142 sends a response to the request for completion of cell monitoring to the switch-side-check-control unit 140. Further, the test-cell-monitor unit 142 notifies the communication-line-control apparatus 92 of the completion of received-ATM-cell monitoring, thereby prompting the ATM switch 90 to get out of the state of reception monitoring.

At a step S64, the switch-side-check-control unit 140 requests the switch-side-signal-control unit 141 to transmit a response to the test-completion request based on results of test-completion operation and results of connection check. At a step S66, the switch-side-signal-control unit 141, based on the results of the test-completion operation and the results of connection check, generates the test signal 150 having a set of information elements 158 as shown in FIG. 8, and sends the test signal 150 from the ATM switch 90 to the MPLS router 80.

At steps S68 and S70, the test signal 150 having the set of information elements 158 is sent from the ATM switch 90 to the MPLS router 80, and the communication-path-data-check-control unit 130 generates test results based on the results of cell-transparency check, the results of connection check, etc., and sends the test results to the IP-packet-communication-control unit 83. The IP-packet-communication-control unit 83 forwards the test results to the maintenance terminal 70.

In this manner, the communication system of the present invention can help to identify a fault point easily and promptly in the MPLS communication scheme. In other words, when the communication system suffers a fault, it is possible to decide which one of the trunk switch and the MPLS router is suffering the fault, thereby separating the fault point from the rest of the system.

Accordingly, prompt recovery can be made in the router, switch, or the communication system where the method of checking communication-path data according to the present invention is employed, thereby providing reliable, better service.

In the claims, a unit for checking consistency corresponds to the steps S14 through S38, and a unit for checking communication corresponds to the steps S40 through S48. Further, the communication-path data controlled by the router corresponds to the label data 41, and the communication-path data controlled by the trunk switch corresponds to the switch data 51.

Further, the present invention is not limited to these embodiments, but various variations and modifications may be made without departing from the scope of the present invention.

The present application is based on Japanese priority application No. 11-310135 filed on Dec. 29, 1999, with the Japanese Patent Office, the entire contents of which are hereby incorporated by reference.

What is claimed is:

1. A method of checking communication-path data in a system in which a router connecting first and second networks operating on different protocols is connected to a switch of the second network, comprising the steps of:

changing the router and the switch from a normal mode to a test mode;

checking consistency between router communication-path data controlled by the router and switch communication-path data controlled by the switch by checking whether the router communication-path data is consistent with the switch communication-path data during the test mode; and checking communication between the router and the switch by sending cells from the router to the switch and returning the cells from the switch to the router during the test mode.

2. The method as claimed in claim 1, further comprising the steps of:

sending results of the consistency check from the switch to the router by sending a test signal; and sending results of the communication check from the switch to the router by sending a test signal.

3. A system in which a router connecting first and second networks operating on different protocols is connected to a switch of the second network, comprising:

a unit for changing the router and the switch from a normal mode to a test mode;

a unit for checking consistency between router communication-path data controlled by the router and switch communication-path data controlled by the switch by checking whether the router communication-path data is consistent with the switch communication-path data during the test mode; and a unit for checking communication between the router and the switch by sending cells from the router to the switch and returning the cells from the switch to the router during the test mode.

4. The system as claimed in claim 3, wherein said unit for checking consistency sends results of the consistency check from the switch to the router by sending a test signal, and said unit for checking communication sends results of the communication check from the switch to the router by sending a test signal.

5. The system as claimed in claim 3, wherein the router communication-path data includes label data of the router, and the switch communication-path data includes switch data of the switch.

6. A router connecting first and second networks operating on different protocols and connected to a switch of the second network, comprising:

a communication-path-data-management unit for storing router communication-path data;

a unit for changing the router from a normal mode to a test mode;

a unit for sending the router communication-path data to the switch during the test mode and receiving from the switch a result of consistency check that indicates if the router communication-path data is consistent with switch communication-path data controlled by the switch; and a unit for sending cells to the switch where the cells are configured to return from the switch to the router during the test mode.

7. A switch connected to a router connecting networks operating on different protocols, comprising:

a data-management unit for storing switch communication-path data;

a unit for changing the switch from a normal mode to a test mode;

a unit for receiving router communications path data from the router, checking whether the router communication-path data is consistent with the switch communication-path data, and sending a result of the check to the router during the test mode; and a unit for receiving cells from the router and sending back the cells to the router during the test mode where the cells transmitted from the router are configured to return from the switch to the router.

* * * * *